United States Patent [19]
Lederer

[11] Patent Number: 5,014,771
[45] Date of Patent: May 14, 1991

[54] HEAT EXCHANGER CORE REINFORCEMENT

[75] Inventor: John F. Lederer, Lockport; Frederick Vincent Oddi, Orchard Park, both of New York.

[73] Assignee: General Motors Corporation, Detroit, Mich.

[21] Appl. No.: 583,934

[22] Filed: Sep. 17, 1990

[51] Int. Cl.⁵ ............................................. F28D 1/00
[52] U.S. Cl. .................................. 165/76; 165/149; 29/890.03; 228/183
[58] Field of Search ............... 165/76, 149, 152, 153; 29/890.03; 228/183

[56] References Cited

U.S. PATENT DOCUMENTS 3,237,688  3/1966  Huggins ........................... 165/152
4,653,580  3/1987  Steele .............................. 165/153

FOREIGN PATENT DOCUMENTS 303384   10/1902  France ............................ 165/152
2123943A  2/1984  United Kingdom ............ 165/149

Primary Examiner—Allen J. Flanigan
Attorney, Agent, or Firm—Ronald L. Phillips

[57] ABSTRACT

A heat exchanger core as prepared for handling and heat bonding has a pair of headers, a row of oval shaped fluid carrying tubes received at opposite ends in the headers, air centers interleaved with the tubes, oval shaped reinforcement tubes sandwiching the fluid carrying tubes and air centers, and processing straps wrapped about the core clamping the fluid carrying tubes and air centers together between the reinforcement tubes.

4 Claims, 2 Drawing Sheets

HEAT EXCHANGER CORE REINFORCEMENT

TECHNICAL FIELD

This invention relates to the reinforcement of heat exchanger cores and more particularly to the reinforcement of oval tubes and air center cores.

BACKGROUND OF THE INVENTION

In the manufacture of heat exchanger cores such as motor vehicle radiators, it is common practice to employ channel shaped reinforcement members that sandwich alternately arranged oval tubes and air centers and contact at their ends with headers that receive opposite ends of the tubes. Processing straps are then wrapped about the thus formed core assembly so that the reinforcements apply a clamping load to hold the assembly tightly together for brazing in addition to later serving to protect the sides of the core as well as reinforce same. While this manner of construction has proven generally satisfactory, there remains the need for continuous improvement, particularly where the core and straps are of different material (e.g. aluminum and steel, respectively), and special reinforcements (and thus added tooling costs) are required to compensate for the differences in thermal expansion during brazing and/or usage. Moreover, as the core depth and thus the tube width is increased for increased performance, the outside tubes have a tendency to collapse along their long side and separate from their slots in the headers, thus resulting in leaks.

SUMMARY OF THE INVENTION

The present invention is directed to using a sacrificial unfunctional-in-the-common-sense tube in place of or in addition to the conventional reinforcement member that normally contacts the respective outside air center. This sacrificial tube may be a shortened standard tube or scrap tube as it is spaced at its ends from the headers and does not carry fluid. Instead, these sacrificial tubes act as clamping members as well as heat expansion devices to take up or compensate for whatever thermal expansion differences occur between the straps and core and/or at the outer tubes. And thus, if these reinforcement tubes collapse during strapping, brazing and/or heat exchanger usage in protection of the functional outer tubes, they do not affect the leak integrity of the heat exchanger. Moreover, if additional reinforcement strength is needed, one or more additional sets of sacrificial tubes may be added and/or they may be located between the outside air centers and conventional reinforcement members.

It is therefore an object of the present invention to provide a new and improved heat exchanger reinforcement arrangement.

Another object is to provide outside tubes in a heat exchanger for clamping and reinforcing the core but not carrying fluid.

Another object is to provide outside tubes in addition to conventional reinforcement members for clamping and reinforcing the core but not carrying fluid.

Another object is to provide in a tube and air center heat exchanger, such as a motor vehicle radiator and heater, tubes arranged on the outer side of the core that contact with respective outer air centers but do not penetrate the headers and serve as clamping members to clamp the core together with the use of straps for brazing, and also as reinforcement members to protect the outermost fluid carrying tubes.

These and other objects, features and advantages of the present invention will become more apparent from the following description and drawing.

DESCRIPTION OF THE PREFERRED EMBODIMENT

Figure 1:
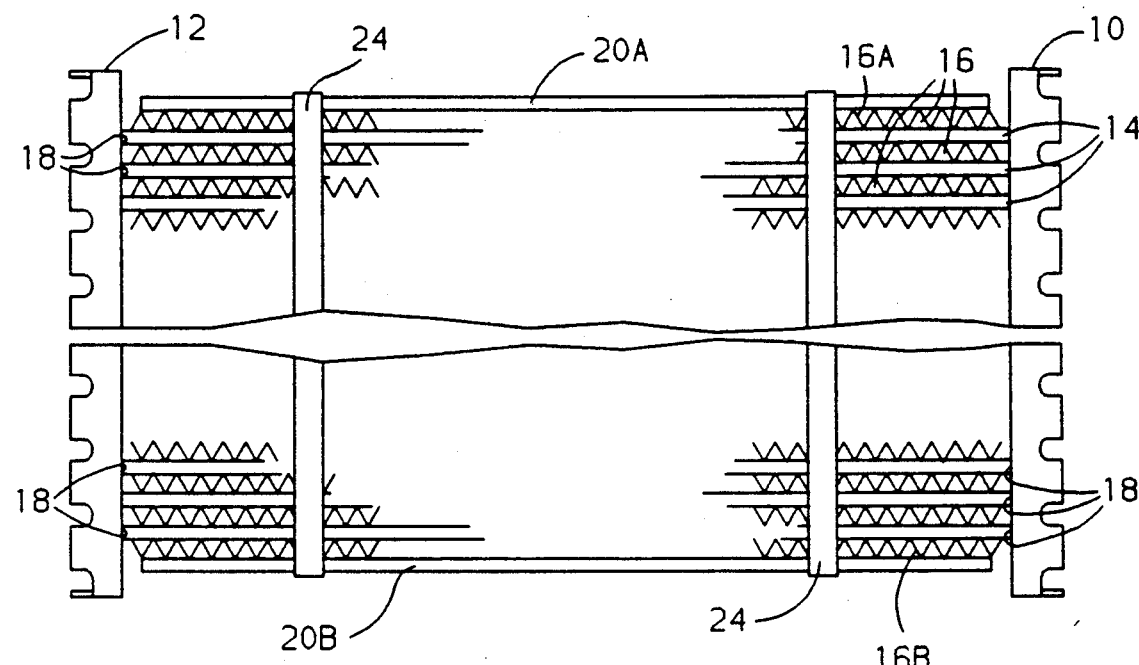
FIG. 1 is a partial frontal view of a motor vehicle radiator core incorporating one embodiment of the present invention.

Referring to FIG. 1, there is shown a motor vehicle engine radiator core comprising a pair of headers 10, 12, oval shaped tubes 14 and air centers 16. The tubes are interleaved with the air centers and received at their opposite ends in slots 18 in the respective headers. The tubes and air centers are further arranged so that there is an air center outboard of a tube at each side of the core, i.e. air centers 16A and 16B. The core thus far described is conventional and normally reinforcement members would then be added that contact with the outside air centers and extend between the headers. Straps would then be applied about these outboard located reinforcement members to clamp the core together for brazing or soldering. And following such bonding of the core, tanks (not shown) would then be attached to the respective headers by crimping of the latter and the straps would be removed.

Figure 2:
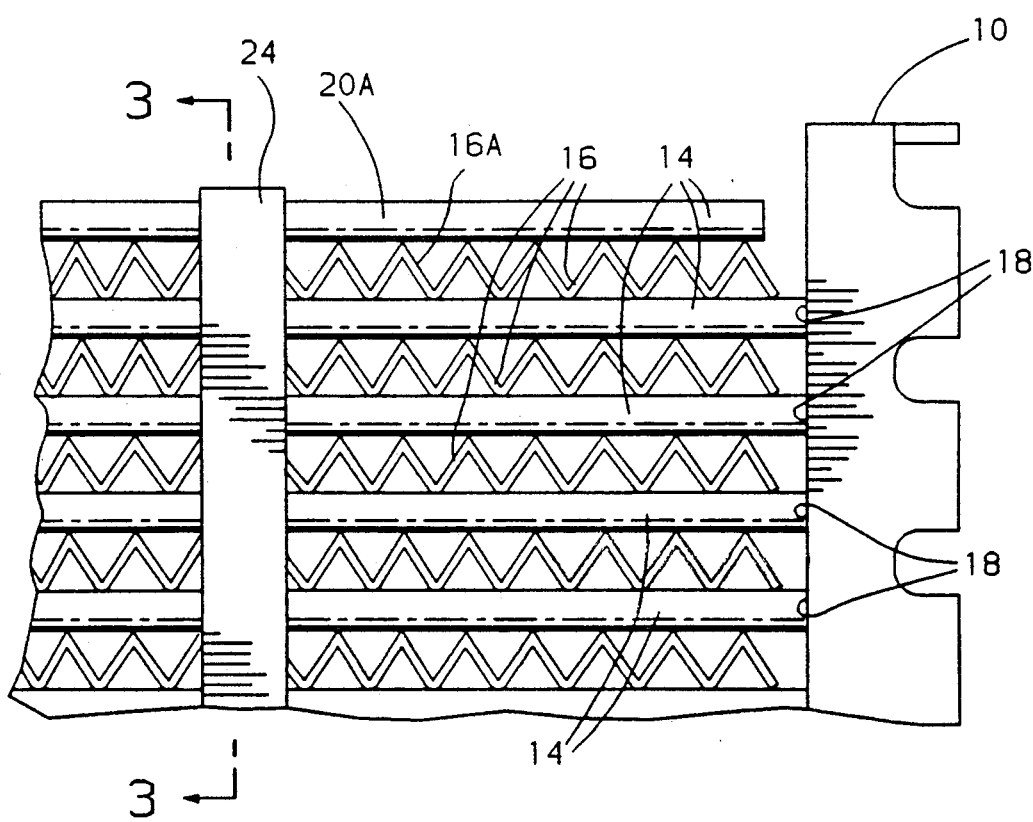
FIG. 2 is an enlarged view of the upper right hand corner of the radiator in FIG. 1.
Figure 3:
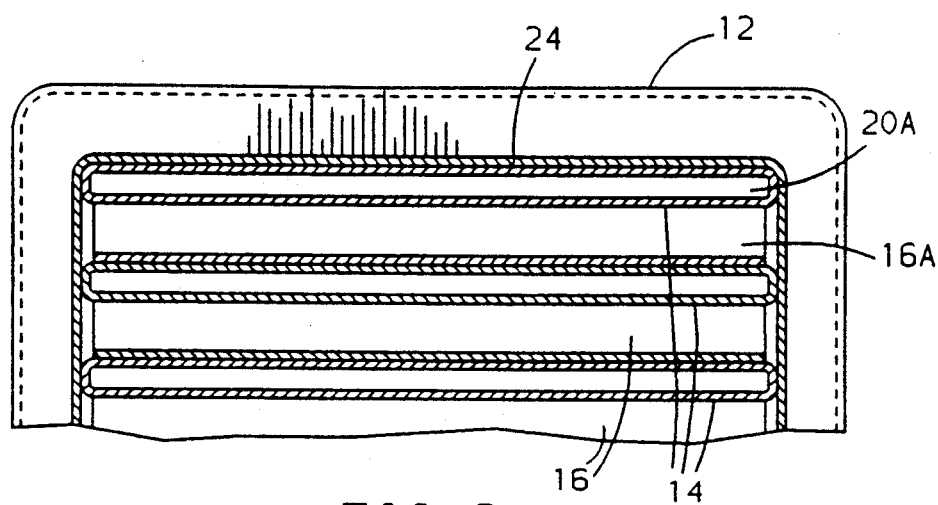
FIG. 3 is a view taken along the line 3—3 in FIG. 2.

According to the present invention, tubes 20A and 20B made from the same stock (possibly production scrap) are arranged to contact with the respective outboard air centers 16A and 16B. The tubes 20A and 20B, which will be referred to as reinforcement tubes because of their use, are shorter than the conventional fluid carrying tubes 14 so as to not contact at their ends with the respective headers as seen enlarged at the one end of the added tube 20A in FIG. 2. The reinforcement tubes thus do not present a possible leakage problem at the headers and, instead of carrying fluid like the other tubes, take the place of the conventional reinforcement members in that the normally used processing straps 24 are wrapped thereabout as seen in FIGS. 1-3 to clamp the fluid carrying tubes and air centers tightly together for bonding (brazing or soldering depending on their material).

Because the reinforcement tubes neither carry fluid nor present a leakage problem, it is of no functional concern that they deform or collapse when the clamping (processing) load is applied by the straps. To the contrary, the reinforcement tubes serve as expansion devices where there is a substantial difference in thermal expansion between the core and bands such as occurs with the heat of bonding when the core is made of aluminum and the straps are made of steel which has a much lower coefficient of thermal expansion.

For example, the steel straps may be initially applied to tightly clamp the aluminum core together but not so tight as to initially deform the reinforcement tubes to any significant extent. Then with the heat of bonding and as the core thermally grows faster than the constraining straps, the reinforcement tubes, since they are not connected in any way with the headers, are free to collapse with the expansion load of the core to prevent collapse of the fluid carrying tubes and, in particular, the outboard fluid carrying tubes to prevent them from separating from their slots in the headers. The reinforcement tubes thus serve as sacrificial devices by being allowed to collapse instead of the fluid carrying tubes. Moreover, following the bonding of the core, the reinforcement tubes continue to serve as damage protection for the two outboard air centers to which they are bonded.

Figure 4:
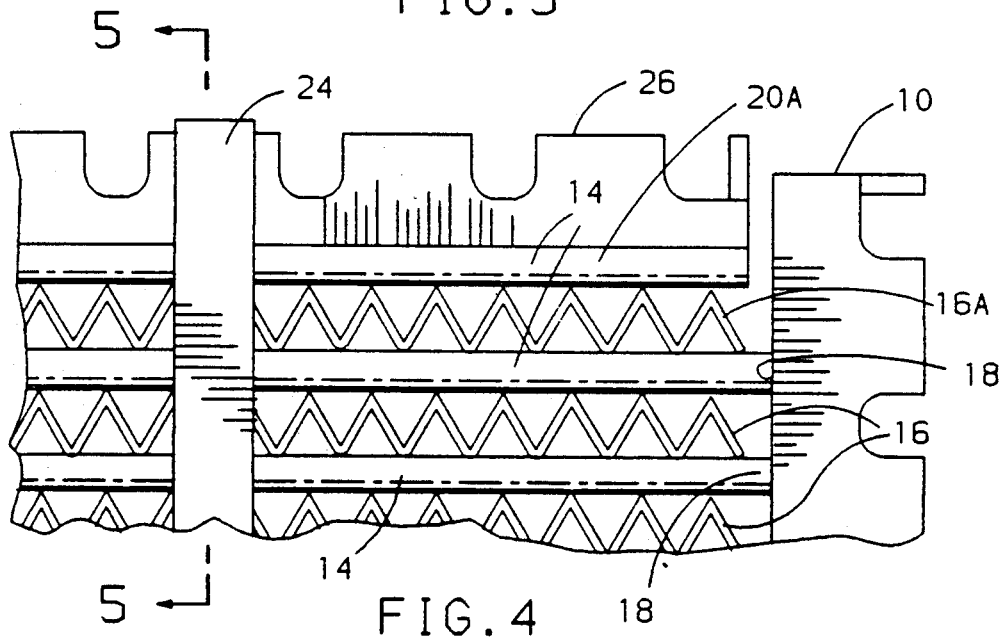
FIG. 4 is a view similar to FIG. 2 but of another embodiment of the present invention.
Figure 5:
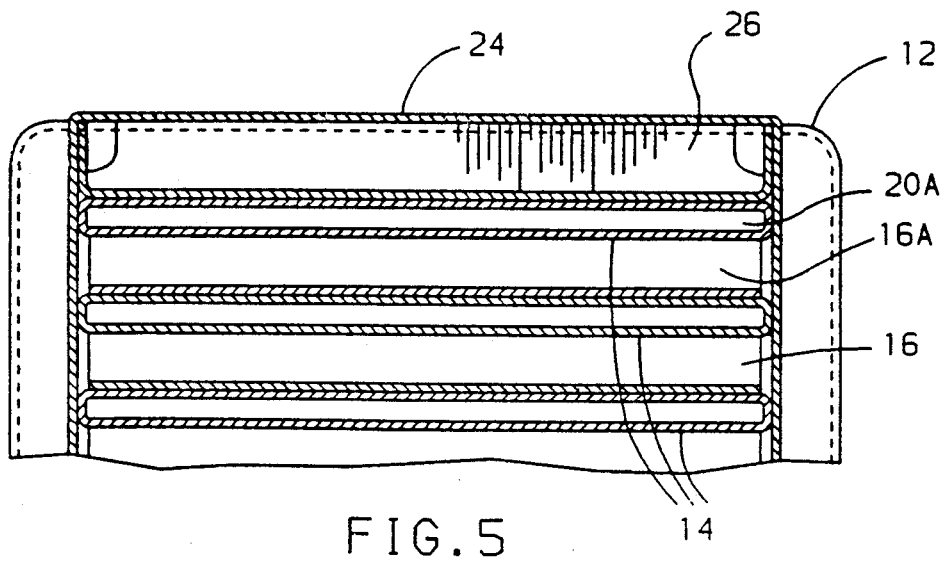
FIG. 5 is a view taken along the line 5—5 in FIG. 4.

For additional reinforcement strength, it is further contemplated that the reinforcement tubes 20A and 20B may be arranged between the outboard air centers 16A and 16B and conventional reinforcement members 26 as shown in FIGS. 4 and 5. The reinforcement tubes are otherwise situated and perform as before but now with the added stiffness of the conventional reinforcement members to apply the processing load as well as further protect and increase the structural integrity of the core.

The foregoing description of the preferred embodiment of the invention has been presented for purposes of illustration and description. It is not intended to be exhaustive or to limit the invention to the precise form disclosed. Obvious modifications or variations are possible in light of the above teachings. For example, the reinforcement tubes need not be of the same stock as the fluid carrying tubes and could be of either heavier or lighter gage tube stock depending on the priorities between stiffness and cost. On the other hand, more than one reinforcement tube of the same or different wall thickness may be used at each side of the core instead of adding a conventional reinforcement member with its attendant much higher cost of tooling. The preferred embodiment was chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A heat exchanger core as prepared for handling and heat bonding comprising a pair of headers, a row of oval shaped fluid carrying tubes received at opposite ends in slots in the respective headers, air centers arranged between and outboard of the outermost of said tubes, a pair of oval shaped reinforcement tubes shorter in length than said fluid carrying tubes, said reinforcement tubes arranged outboard of the respective outboard air centers and extending between but not received by said headers, and at least one processing strap having a lower thermal coefficient of expansion than said tubes wrapped about the core so as to tightly clamp the air centers and fluid carrying tubes together between the reinforcement tubes for handling and heat bonding.

2. A heat exchanger core as prepared for handling and heat bonding comprising a pair of headers, a row of oval shaped fluid carrying tubes received at opposite ends in slots in the respective headers, air centers arranged between and outboard of the outermost of said tubes, a pair of reinforcement tubes made of the same stock as said fluid carrying tubes but shorter in length than the latter, said reinforcement tubes arranged outboard of the respective outboard air centers and extending between but not received by said headers, and at least one processing strap having a lower thermal coefficient of expansion than said tubes wrapped about the core so as to tightly clamp the air centers and fluid carrying tubes together between the reinforcement tubes for handling and heat bonding.

3. A heat exchanger core as prepared for handling and heat bonding comprising a pair of headers, a row of oval shaped fluid carrying tubes received at opposite ends in slots in the respective headers, air centers arranged between and outboard of the outermost of said tubes, a pair of reinforcement tubes made of the same stock as said fluid carrying tubes but shorter in length than the latter, said reinforcement tubes arranged outboard of the respective outboard air centers and extending between but not received by said headers, a pair of channel shaped reinforcement members shorter in length than said fluid carrying tubes, said reinforcement members arranged outboard of the respective reinforcement tubes and extending between but not received by said headers, and at least one processing strap having a lower thermal coefficient of expansion than said tubes wrapped about the core so as to tightly clamp the air centers and fluid carrying tubes together between the reinforcement tubes and members for handling and heat bonding.

4. A heat exchanger core as prepared for handling and heat bonding comprising a pair of headers, a row of oval shaped fluid carrying tubes received at opposite ends in slots in the respective headers, air centers arranged between and outboard of the outermost of said tubes, at least two oval shaped reinforcement tubes made of the same stock as said fluid carrying tubes but shorter in length than the latter, said reinforcement tubes arranged outboard of the respective outboard air centers and extending between but not received by said headers, and at least one processing strap having a lower thermal coefficient of expansion than said tubes wrapped about the core so as to tightly clamp the air centers and fluid carrying tubes together between the reinforcement tubes for handling and heat bonding.

* * * * *